United States Patent
Miyahara et al.

(10) Patent No.: US 6,297,867 B1
(45) Date of Patent: Oct. 2, 2001

(54) WIDE VIEW ANGLE LCD OPERABLE IN IPS MODE WHICH USES A PIXEL ELECTRODE AS A SHIELD TO PREVENT DISTURBANCES IN THE ELECTRIC FIELD OF A DISPLAY PIXEL PORTION OF THE LCD

(75) Inventors: Tae Miyahara; Michiaki Sakamoto; Hironori Kikkawa, all of Tokyo (JP)

(73) Assignee: NEC Corporation, Tokyo (JP)

(*) Notice: Subject to any disclaimer, the term of this patent is extended or adjusted under 35 U.S.C. 154(b) by 0 days.

(21) Appl. No.: 09/190,819

(22) Filed: Nov. 12, 1998

(30) Foreign Application Priority Data

Nov. 12, 1997 (JP) ..................................... 9-310340

(51) Int. Cl.$^7$ ............................................... G02F 1/1345
(52) U.S. Cl. ............................................................ 349/141
(58) Field of Search ............................................... 349/141

(56) References Cited

U.S. PATENT DOCUMENTS

| | | | |
|---|---|---|---|
| 5,574,582 | 11/1996 | Takeda et al. | 359/59 |
| 5,745,207 | * 4/1998 | Asada et al. | 349/141 |
| 5,852,485 | * 12/1998 | Shimada et al. | 349/141 |
| 6,108,065 | * 8/2000 | Ota et al. | 349/141 |

FOREIGN PATENT DOCUMENTS

| | | |
|---|---|---|
| 3-148636 | 6/1991 | (JP). |
| 9-269504 | 8/1992 | (JP). |
| 6-148595 | 5/1994 | (JP). |
| 6-222397 | 8/1994 | (JP). |
| 8-171082 | 7/1996 | (JP). |
| 4-052925 | 10/1997 | (JP). |

* cited by examiner

*Primary Examiner*—Kenneth Parker
(74) *Attorney, Agent, or Firm*—Sughrue, Mion, Zinn, Macpeak & Seas, PLLC

(57) ABSTRACT

The present invention discloses a liquid crystal display device which is arranged by: (A) the first substrate including a plurality of scanning lines and a plurality of signal lines arranged in a matrix form; a common signal line extended in parallel to one of the scanning lines and the signal lines, for applying a reference potential thereto; a pixel electrode; and a thin-film transistor having a source electrode connected to the pixel electrode, a drain electrode connected to the signal line, and a gate electrode connected to the scanning line, the thin-film transistor being formed in an intersection portion between the scanning line and the signal line; (B) the second substrate including a black matrix layer and positioned opposite to the first substrate with sandwiching a liquid crystal layer between the first substrate and the second substrate; and (C) an insulating layer sandwiched between the pixel electrode of the first substrate and the scanning line. While a voltage is applied between the common signal line and the pixel electrode to thereby produce an electric field, a direction of a molecular axis of liquid crystal molecules contained in the liquid crystal layer is rotated within a plane located in parallel to the first substrate so as to perform a liquid crystal display; and further said pixel electrode of the first substrate covers a portion of the scanning lines located in a region other than such a region where the thin-film transistor is formed.

19 Claims, 9 Drawing Sheets

WIDE VIEW ANGLE LCD OPERABLE IN IPS MODE WHICH USES A PIXEL ELECTRODE AS A SHIELD TO PREVENT DISTURBANCES IN THE ELECTRIC FIELD OF A DISPLAY PIXEL PORTION OF THE LCD

BACKGROUND OF THE INVENTION

1. Field of the Invention

The present invention generally relates to a liquid crystal display device, and more specifically, to a wide view angle liquid crystal display device operable in an IPS (In-Plane Switching) mode.

2. Description of the Related Art

In general, there are two different modes of liquid crystal display devices (LCD). That is, in an TN (Twisted Nematic) mode LCD, a direction of a molecular axis (will be referred to as a "director" hereinafter) of oriented liquid crystal molecules is rotated along a vertical direction with respect to a substrate so as to perform an LCD display. In an IPS (In-Plane switching) mode LCD, a director of oriented liquid crystal molecules is rotated within a horizontal plane with respect to a substrate so as to execute an LCD display.

As to the IPS mode of the LCD device, even when a visual point is moved, only the short axial direction of the liquid crystal molecules is basically observed. As a result, the wide view angle can be achieved without view angle dependency of "rising ways" of the liquid crystal molecules, as compared with a TN mode of a liquid crystal display. As a consequence, such an IPS mode of a liquid crystal display device will be called a "wide view angle liquid crystal display device".

Conventionally, in this sort of wide view angle liquid crystal display device, as described in, for instance, Japanese Patent Laid-open Application No. Hei6-148595 published in 1994, the pixel electrodes and the common electrodes, which are used to apply the electric field to the liquid crystal are provided in such a manner that these electrodes are arrayed in a predetermined interval within the same plane. The electric field is applied between both the pixel electrode and the common electrode in a parallel manner with respect to the surface of the substrate, and the director of the liquid crystal molecule is rotated within the horizontal plane so as to perform the LCD display. FIG. 7 is a plan view for indicating the structure of one pixel employed in the liquid crystal display device as described in the above-mentioned official publication document. FIG. 8 is a sectional view for showing this liquid crystal display device, taken along a line E to E of FIG. 7. FIG. 9 is a sectional view for indicating this liquid crystal display device, taken along a line F to F of FIG. 7.

Referring to FIG. 7 to FIG. 9, the structure of the conventional liquid crystal display device will be described.

In the conventional liquid crystal display device, a plurality of scanning lines 3 and a plurality of signal lines 4 are arranged in the matrix form on the transparent insulating substrate 1. Furthermore, the common electrode line 11 is formed in parallel to the scanning lines 3. The thin-film transistor (TFT) 6 is formed, and the pixel electrode 10 electrically connected to the source electrode of the thin-film transistor 6 is formed at the intersection portion of the scanning line 3 and the signal line 4.

As indicated in FIG. 7, the stripe-shaped drawing electrodes are branched from the pixel electrode 10 and the common electrode line 11 and are extended along the direction of the signal line 4. The drawing electrodes connected to the respective electrodes 10 and 11 are staggered in a parallel manner. When the voltage is applied to these drawing electrodes, such an electric field 100 is produced which mainly has the electric field component in parallel to the scanning line 3, and also in parallel to the substrate surface.

Next, the above-described thin-film transistor 6 will be described more in detail with reference to FIG. 9. This thin-film transistor 6 has such a structure, generally called as a "reverse stagger structure" that the channel layer 5, the source electrode 10, and the drain electrode 4 are located above the gate electrode 3.

As indicated in FIG. 9, the gate electrode 3 electrically connected to the scanning line 3 is formed on the transparent insulating substrate 1. The gate insulating film 16 is formed on the entire surface of this gate electrode 3 so as to cover this gate electrode 3.

Then, the amorphous silicon layer 5 is formed on the gate insulating film 16 above the gate electrode 3, and this amorphous silicon layer 5 constitutes the channel layer. The drain electrode 4 is connected to one side of the amorphous silicon layer 5. The drain electrode 4 is electrically connected to the signal line 4. The source electrode 4 is connected to another side of this amorphous silicon layer 5, and the source electrode 10 is further connected to the pixel electrode 10.

It should be noted that the $n^+$ type amorphous silicon layer 15 to which the n type impurity is doped in high concentration is provided among the drain electrode 4, the source electrode 10, and the amorphous silicon layer 5. The reason why this $n^+$ type amorphous silicon layer 15 is provided is to establish to ohmic contact among the amorphous silicon layer 5, the drain electrode, and the source electrode. Furthermore, the passivation layer 13 is provided in such a manner that this passivation layer 13 entirely covers all of these components. The TFT-sided liquid crystal orientation layer 17 used to orientate the liquid crystal molecules along the direction suitable for the liquid crystal operation mode is provided on the passivation film 13.

The active element substrate 19 is constituted by the structural elements defined from the above-explained transparent insulating substrate 1 up to the TFT-sided liquid crystal orientation layer 17.

In addition, the counter substrate 20 equal to the color filter (CF) is provided via the liquid crystal layer 14 opposite to this active element substrate 19. As this counter substrate 20, the black matrix layer 7, the color layer 8, and the CF-sided liquid crystal orientation layer 12 are successively stacked on the transparent insulating substrate 2. This black matrix layer 7 is provided so as to hide the thin-film transistor 6, the scanning line 3, the signal line 4, and the like with respect to the external field of this thin-film transistor 6. The counter substrate 20 on the side of the CF-sided liquid crystal orientation layer 12 is faced to the liquid crystal layer.

The above-explained active element substrate 19, liquid crystal layer 14, and counter substrate 20 constitute the active matrix liquid crystal display device.

In this counter substrate 20, when the thickness of the black matrix layer 7 becomes thick, a difference between the thicknesses of the portions within the counter substrate 20, in which the black matrix layer 7 is present and is not present, is increased. The dimensions of the concaves/convexes formed on the substrate of the counter substrate 20 are increased. As a result, since the thickness of the liquid crystal layer 14 sandwiched between the active element substrate 19 and the counter substrate 20 is fluctuated within the panel surface, this thickness fluctuation may cause display fluctuations. To avoid such a difficulty, this black matrix layer 7 is made of a thinner metal in order that the thickness of the black matrix layer 7 can be made thinner.

Referring to FIG. 8, a description will be made of a structure of such a portion that the scanning line 3 is located in parallel to the common electrode line 11. As indicated in this drawing, on the side of the active element substrate 19, both the scanning line 3 and the common electrode line 11 are located in a parallel manner on the transparent insulating substrate 11, on which the gate insulating film 16, the passivation film 13, and the TFT-sided liquid crystal orientation layer 17 are stacked. Also, on the side of the counter substrate 20, there is provided the same structure as that shown in FIG. 9.

On the other hand, different from the conventional TN mode of liquid crystal display device, in the conventional IPS mode of liquid crystal display device, the common electrode 11 is formed on the active element substrate 19, but is not provided on the counter substrate 20. As a result, the metal which constitutes the black matrix layer 7 is set to the floating condition. In this case, the below-mentioned problem will occur.

In the case that the black matrix layer 7 is made of a metal, this black matrix layer 7 owns a certain potential, because this metal black matrix layer 7 is influenced by the potential on the side of the active element substrate 19 located just above the black matrix layer 7. Where there is a difference between the potential owned by the black matrix layer 7 and the potential at the display pixel portion, since the electric field is produced between the black matrix layer and the display pixel portion, the electric field of the display pixel portion would be disturbed.

This problem will now be explained more in detail with reference to FIG. 7 to FIG. 9.

As represented in FIG. 7, the patterns on the side of the active element substrate 19 which is located opposite to the black matrix layer 7 on the side of the counter substrate 20 are subdivided into the scanning line 3, the common electrode line 11, and the signal line 4.

First, as represented in FIG. 8, the black matrix layer 7 on the side of the counter substrate 20 which is located opposite to the scanning line 3 and the common electrode line 11 is capacitive-coupled to both the scanning line 3 and the common electrode line 11 via the color layer 8, the liquid crystal orientation layer 12, the liquid crystal layer 14, the liquid crystal orientation film 17, the passivation film 13, and the gate insulating film 16. On the other hand, as shown in FIG. 9, similar to both the scanning line 3 and the common electrode line 11, the black matrix layer 7 located opposite to the signal line 4 is capacitive-coupled to the signal line 4 via the color layer 8, the liquid crystal orientation film 12, the liquid crystal layer 14, the liquid crystal orientation film 17, and the insulating films 13 and also 16.

Eventually, the potential at the floating black matrix layer 7 corresponding to the electric conductor may be mainly determined based on the respective potentials at the scanning line 3, the common electrode line 11, and the signal line 4, and further the coupling capacitances among the scanning line 3/common electrode line 11/signal line 4, and this black matrix layer 7. This potential of the floating black matrix layer 7 is expressed by the below-mentioned formula (1):

$$V_{BM} = (C_{BM-G}/C_{tot}) \times V_{Goff} + (C_{BM-COM}/C_{tot}) \times V_{COM} + (C_{BM-D}/C_{tot}) \times VD \quad (1),$$

where the following symbols are defined:

$C_{BM-G}$: a capacitance value between the BM (black matrix) layer 7 and the scanning line appearing on the BM layer 7.

$C_{tot}$: a total capacitance value of capacitance values among the scanning line appearing on the BM layer, the common electrode line, and the BM layer.

$V_{Goff}$: a potential at the scanning line (TFT transistor is turned OFF).

$C_{BM-COM}$: a capacitance value between the common electrode line appearing on the BM layer and the BM layer.

$V_{COM}$: a potential at the common electrode.

$C_{BM-D}$: a capacitance value between the BM layer and the signal line appearing on the BM layer.

$V_D$: a potential at the signal line.

It should be noted that since the capacitance coupling between the TFT portion and the black matrix layer 7 is very small, as compared with the above-explained other capacitive-coupling, the first-mentioned capacitive coupling is omitted.

On the other hand, when the active matrix LCD device is driven in the polarity inversion, it is conceivable that an average potential of the potentials at the signal line 4 is equal to the potential at the common electrode line 11. As a consequence, it is also conceivable that an average potential at the display pixel portion is substantially equal to the potential at the common electrode line 11. As a consequence, there is no risk that the potential at the black matrix layer 7 never greatly disturbs the electric field of the display pixel portion. However, as apparent from the below-mentioned formula (2), since the potential at the black matrix layer 7 is further influenced by the potential at the scanning line 3, this potential of the black matrix layer 7 becomes such a value deviated from the potential at the common electrode line 11 only by:

$$(C_{BM-G}/C_{tot}) \times (V_{Goff} - V_{COM}) \quad (2).$$

As a consequence, in the conventional active matrix LCD device having the above-explained structure, since the potential at the black matrix layer 7 may disturb the electric field of the display pixel portion, there is the display fluctuation problem.

Also, in the wide view angle LCD device, the birefringent characteristic (double refraction characteristic) of the liquid crystal 14 must be precisely controlled by the electric field appearing in parallel to the plane of the substrate 19. The electric field on the color filter contains the vertical component with respect to the substrates 19 and 20. Since the liquid crystal molecules are rotated along the direction perpendicular to the substrates 19 and 20, the birefringent characteristic of the liquid crystal 14 is largely changed, so that the degree of the display fluctuation becomes very large, as compared with that of the TN mode of the LCD device.

SUMMARY OF THE INVENTION

The present invention has been made to solve the above-described problems, and therefore, has an object to provide such a liquid crystal display device, namely a wide view angle liquid crystal display device capable of employing even such a color filter whose black matrix layer is made of an electric conductive member without any disturbance in an electric field of a display pixel portion thereof.

To achieve the above-explained object, a liquid crystal display device, according to a first aspect of the present invention, is featured by such a liquid crystal display device comprising:

(A) a first substrate including a plurality of scanning lines and a plurality of signal lines arranged in a matrix form; a common signal line extended in parallel to one of the scanning lines and the signal lines, for applying a reference potential thereto; a pixel electrode; and a thin-film transistor having a source electrode connected to the pixel electrode, a drain electrode connected to the signal line, and a gate electrode connected to the scanning line, the thin-film transistor being formed in an intersection portion between the scanning line and the signal line;

(B) a second substrate including a black matrix layer and positioned opposite to the first substrate with sandwiching a liquid crystal layer between the first substrate and the second substrate; and (C) an insulating layer sandwiched between the pixel electrode of the first substrate and the scanning line; wherein:

while a voltage is applied between the common signal line and the pixel electrode to thereby produce an electric field, a direction of a molecular axis of liquid crystal molecules contained in the liquid crystal layer is rotated within a plane located in parallel to the first substrate so as to perform a liquid crystal display; and further the pixel electrode of the first substrate covers a portion of the scanning lines located in a region other than such a region where the thin-film transistor is formed.

In the liquid crystal display device according to the above-described first aspect of the present invention, the pixel electrode of the first substrate further covers one of a portion, a major portion, and all of the scanning lines located within the thin-film transistor forming region, while sandwiching the insulating layer between the scanning lines and this pixel electrode.

In the liquid crystal display device according to the above-described first aspect of the present invention, the black matrix layer is made of an electric conductive material.

In the liquid crystal display device according to the above-described first aspect of the present invention, a region surrounded by the scanning line and the signal line constitutes a single pixel portion; and a pixel electrode of the one pixel portion covers the scanning line belonging to another pixel portion adjacent to the one pixel portion.

In the liquid crystal display device according to the above-described first aspect of the present invention, the thin-film transistor includes:

the gate electrode formed on a transparent insulating substrate;

a gate insulating film for covering the gate electrode;

a channel layer formed on the gate insulating film over the gate electrode;

the gate electrode and the drain electrode, which are formed in both edge portions of the channel layer; and an insulating layer for covering the channel layer, the source electrode, and the drain electrode.

In the liquid crystal display device according to the above-described first aspect of the present invention, the scanning lines and the common signal line are formed on the transparent insulating substrate, whereas the pixel electrode and the signal lines are formed on the gate insulating film.

In the liquid crystal display device according to the above-described first aspect of the present invention, the insulating layer has an opening portion; and the pixel electrode is formed on the insulating layer, and is connected via the opening portion of the insulating layer to the source electrode of the thin-film transistors Also, a liquid crystal display device, according to a second aspect of the present invention, is featured by such a liquid crystal display device comprising:

(A) a first substrate including a plurality of scanning lines and a plurality of signal lines arranged in a matrix form; a common signal line extended in parallel to one of the scanning lines and the signal lines, for applying a reference potential thereto; a pixel electrode; and a thin-film transistor having a source electrode connected to the pixel electrode, a drain electrode connected to the signal line, and a gate electrode connected to the scanning line, the thin-film transistor being formed in an intersection portion between the scanning line and the signal line;

(B) a second substrate including a black matrix layer and positioned opposite to the first substrate with sandwiching a liquid crystal layer between the first substrate and the second substrate; and (C) an insulating layer sandwiched between the pixel electrode of the first substrate and the scanning line; wherein:

while a voltage is applied between the common signal line and the pixel electrode to thereby produce an electric field, a direction of a molecular axis of liquid crystal molecules contained in the liquid crystal layer is rotated within a plane located in parallel to the first substrate so as to perform a liquid crystal display; and further the pixel electrode of the first substrate covers a major portion of the scanning lines located in a region other than such a region where the thin-film transistor is formed.

Moreover, a liquid crystal display device, according to a third aspect of the present invention, is featured by such a liquid crystal display device comprising:

(A) a first substrate including a plurality of scanning lines and a plurality of signal lines arranged in a matrix form; a common signal line extended in parallel to one of the scanning lines and the signal lines, for applying a reference potential thereto; a pixel electrode; and a thin-film transistor having a source electrode connected to the pixel electrode, a drain electrode connected to the signal line, and a gate electrode connected to the scanning line, the thin-film transistor being formed in an intersection portion between the scanning line and the signal line;

(B) a second substrate including a black matrix layer and positioned opposite to the first substrate with sandwiching a liquid crystal layer between the first substrate and the second substrate; and (C) an insulating layer sandwiched between the pixel electrode of the first substrate and the scanning line; wherein:

while a voltage is applied between the common signal line and the pixel electrode to thereby produce an electric field, a direction of a molecular axis of liquid crystal molecules contained in the liquid crystal layer is rotated within a plane located in parallel to the first substrate so as to perform a liquid crystal display; and further the pixel electrode of the first substrate covers all of portions the scanning lines located in a region other than such a region where the thin-film transistor is formed.

In the structure of this liquid crystal display device, the pixel electrode covers the scanning line provided at the prestage with respect to the extension direction of the signal line. That is, this LCD structure of the present invention has such a different point from the conventional wide view angle LCD device structure that the pixel electrode may cover the scanning lines over a portion, on an entire region which is located opposite to the liquid crystal layer via only the insulating film formed on the scanning lines.

As a consequence, even when the color filter is used in which the black matrix layer is formed by the electric conductive member, the electric field produced from the scanning lines is shielded, and thus there is no adverse influence caused by the potential at the scanning lines with respect to the potential at the black matrix layer. In other words, since the potential at the scanning lines is not leaked to the liquid crystal layer, the average potential of the black matrix layer becomes substantially equal to the potential at the common electrode line, which can suppress the electric field produced between the black matrix layer and the display portion in the conventional wide view angle liquid crystal device. In particular, since the interlayer insulating film is sandwiched between the thin-film transistor and the pixel electrode these pixel electrode and thin-film transistor can be formed on the different interlayer insulating layers. As a result, the overall scanning line containing the thin-film transistor located in the display portion can be covered. Accordingly, there is no risk that the potential at the scanning line is leaked to the liquid crystal layer.

Therefore, since the electric field of the scanning lines is shielded by the pixel electrode, the adverse influence caused by the potential of these scanning lines with respect to the potential at the black matrix layer can be considerably reduced. As a result,the electric field of the display pixel portion cannot be disturbed.

Thus, the wide view angle LCD device according to this embodiment can largely reduce the electric field produced between the black matrix layer and the display portion to suppress the display fluctuation occurred in the conventional LCD device.

BRIEF DESCRIPTION OF THE DRAWINGS

The above and further objects, advantages and features of the present invention will more apparent from the following description taken in conjunction with the accompanying drawings in which.

DESCRIPTION OF THE PREFERRED EMBODIMENTS

Referring now to drawings, various preferred embodiments of the present invention will be described in detail.

STRUCTURE OF FIRST WIDE VIEW ANGLE LCD

Figure 1:
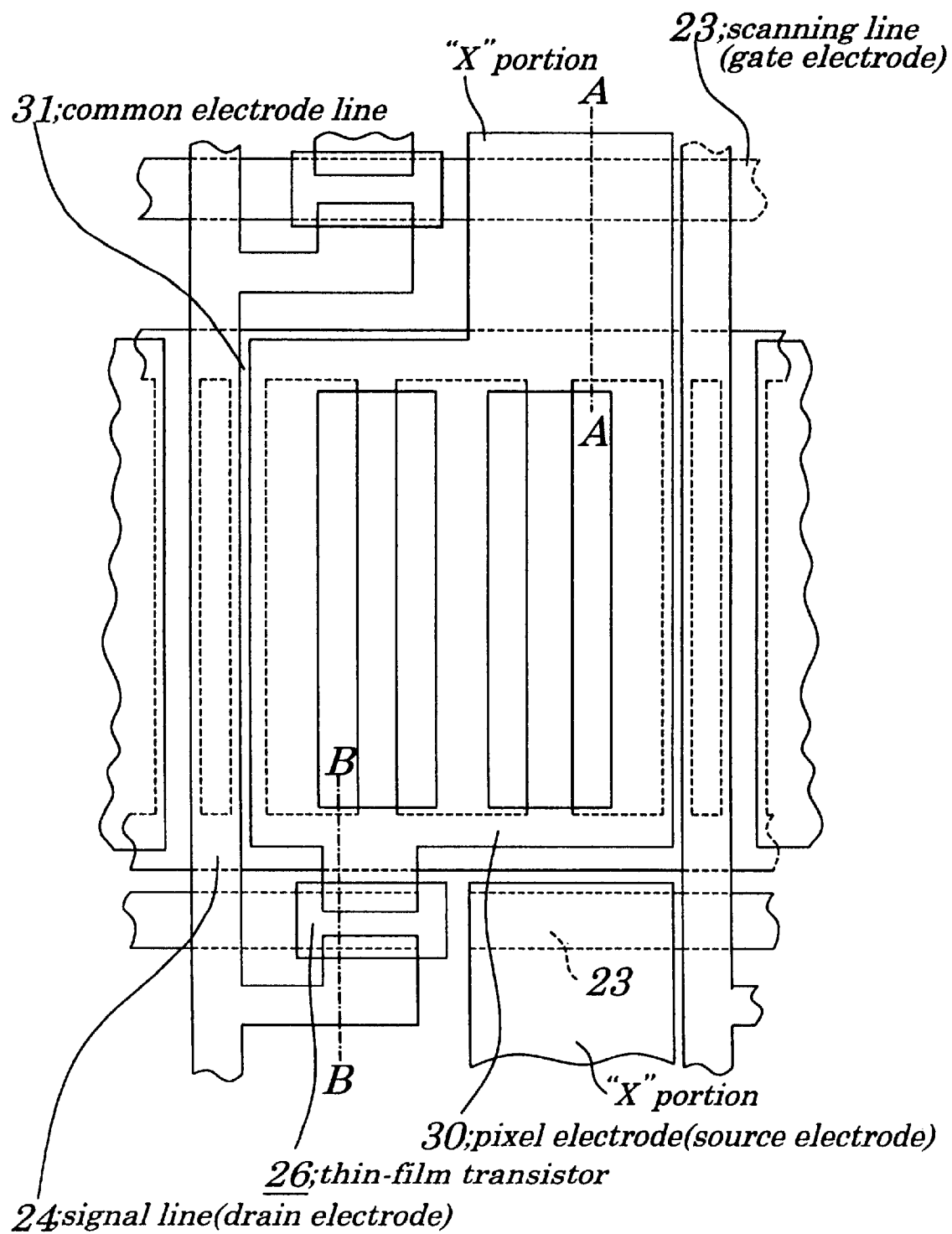
FIG. 1 is an upper view for schematically showing a structure of one pixel of a wide view angle liquid crystal display device according to a first embodiment of the present invention.
Figure 2:
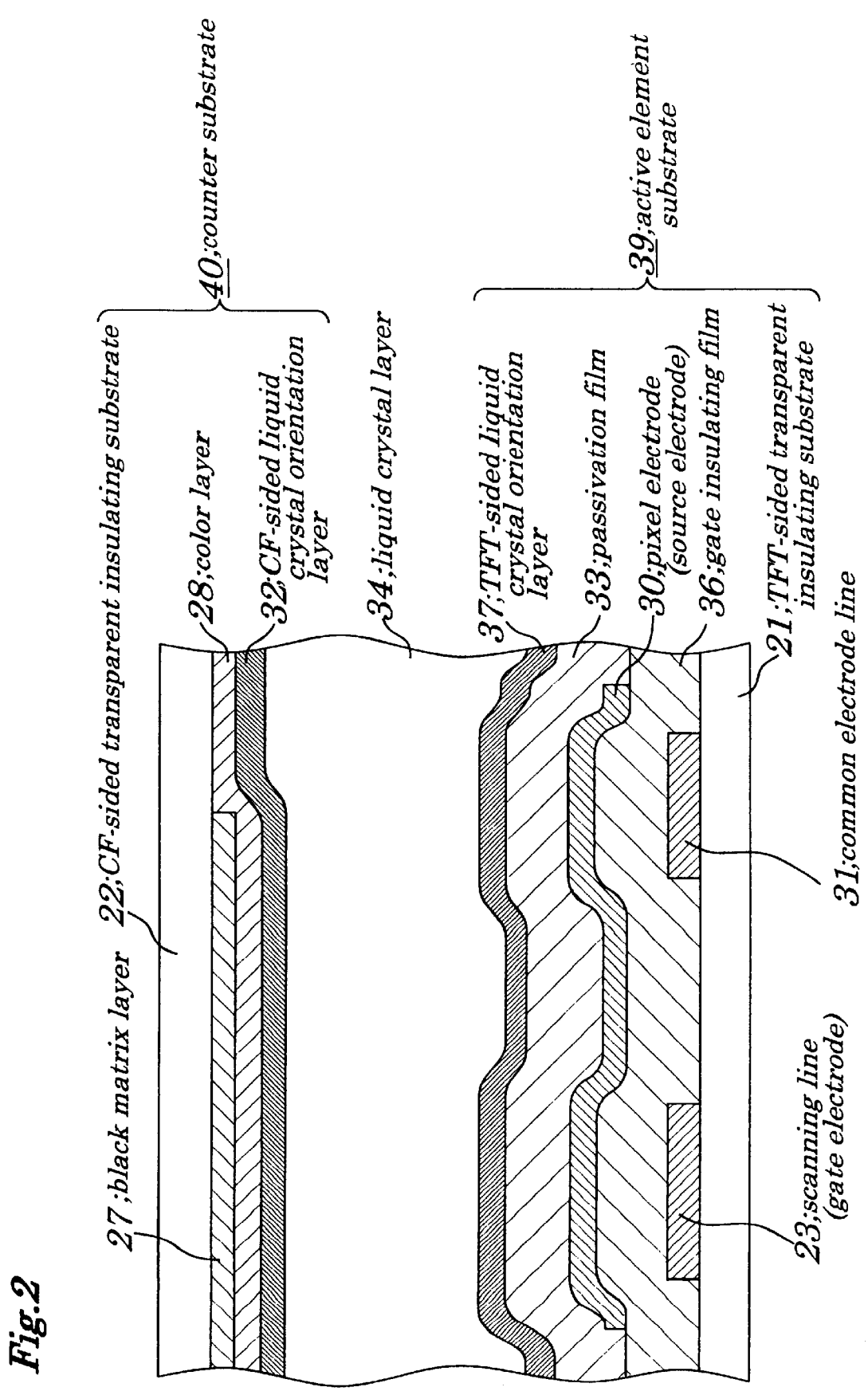
FIG. 2 is a sectional view for indicating the one pixel structure of the wide view angle liquid crystal display device, taken along a line A—A of FIG. 1.
Figure 3:
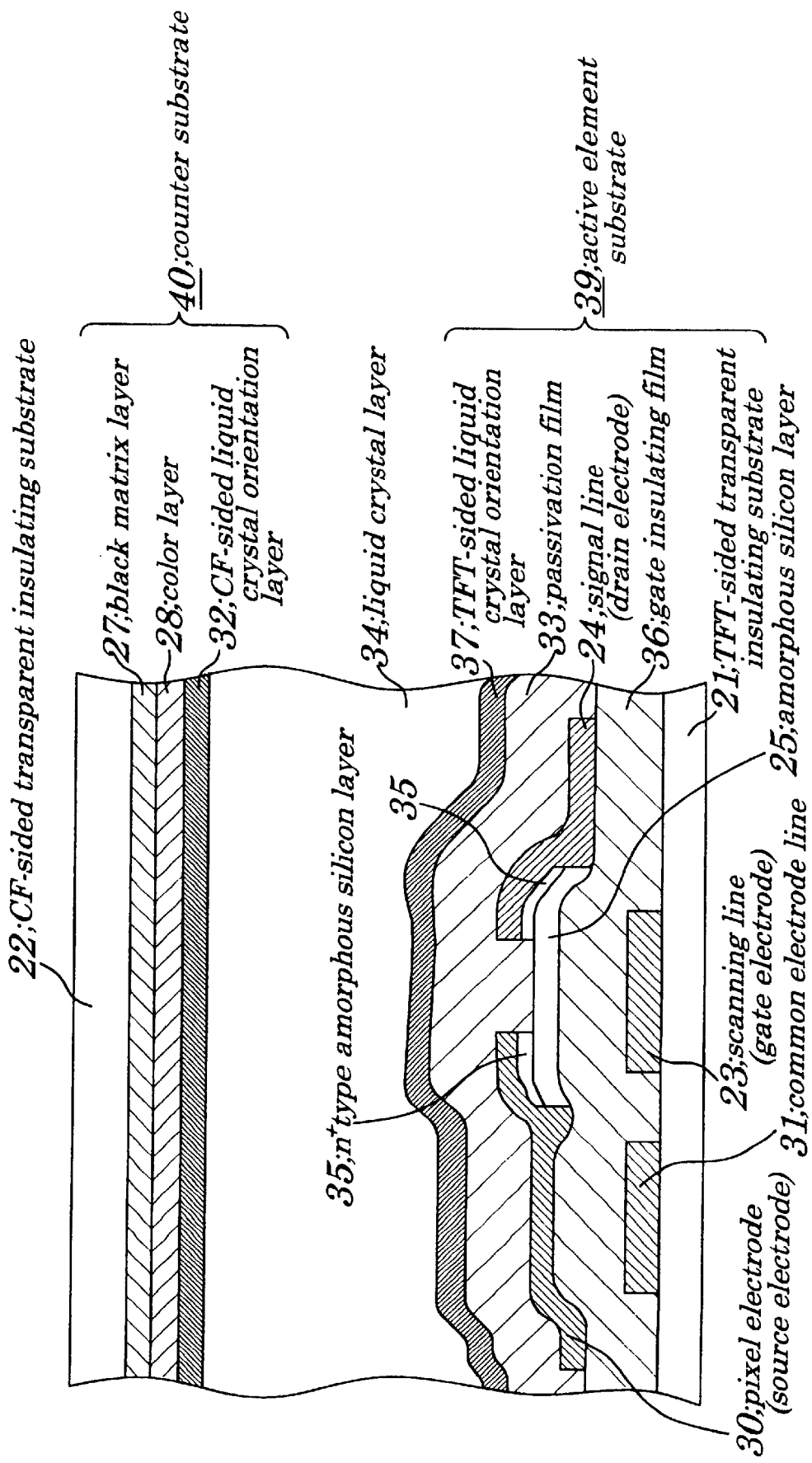
FIG. 3 is a sectional view for indicating the one pixel structure of the wide view angle liquid crystal display device, taken along a line B—B of FIG. 1.

FIG. 1 is a plan view for schematically showing a structure of a display pixel of a wide view angle liquid crystal display (LCD) device according to a first embodiment of the present invention. FIG. 2 is a sectional view for indicating the wide view angle LCD device according to the first embodiment, taken along a line A—A of FIG. 1. Also, FIG. 3 is a sectional view for representing the wide view angle LCD device according to the first embodiment, taken along a line B—B of FIG. 1.

As shown in FIG. 1, the wide view angle LCD device according to this first embodiment is arranged by a scanning line 23, a signal line 24, a common electrode line 31, a pixel electrode 30, and a thin-film transistor (TFT) 26, which are formed on a transparent insulating substrate 21 on the side of an active element substrate 39. A scanning line signal is supplied to the scanning line 23, and a data signal is supplied to the signal line 24. A reference potential is applied to the common electrode line 31. The pixel electrode 30 corresponds to a pixel to be displayed. The common electrode line 31 is formed in the vicinity of a scanning line 23 provided at prestage, and also of a scanning line 23 of the relevant pixel. The common electrode line 31 and the scanning lines 23 are arranged in a parallel manner. One pixel is defined by a region surrounded by the common electrode line 31 provided in the vicinity of the scanning line 23 at the prestage, the scanning line 23, and the signal line 24. Also, the signal line 24 is extended along a direction perpendicular to the common electrode line 31 and the scanning line 23. Then, the thin-film transistor 26 is formed at an intersection portion between the scanning line 23 and the signal line 24 above the scanning line 23.

In this embodiment, the pixel electrode 30 is made of an electric conductive transparent film such as ITO (indium tin oxide), whereas the scanning line 23, the signal line 24, and the common electrode line 31 are made of metal films such as aluminium films. Alternatively, it should be understood that the scanning line 23, the signal line 24, and the common electrode line 31 may be manufactured by the electric conductive transparent film such as ITO.

A stripe-shaped drawing electrode is branched from the pixel electrode 30, and also another stripe-shaped drawing electrode is branched from the common electrode line 31. Both these stripe-shaped drawing electrodes are extended along the same direction of the signal line 24. The drawing electrodes connected to the respective electrodes 30 and 31 are arranged in such a way that these drawing electrodes are staggered in a parallel manner. When a voltage is applied between these drawing electrodes, an electric field is produced. A major field is produced. A major field component of this electric field is located in parallel to the surfaces of the substrates 39 and 40 and also in parallel to the scanning line 23.

Also, the drawing electrodes of the pixel electrode 30 are combined with each other to form a single drawing electrode on the common electrode line 31 in the vicinity of the pixel provided at the prestage. A portion of this pixel electrode 30 is extended along the direction (indicated by "X" portion) of the scanning line 23 at the prestage, and also in a direction along which the signal line 24 is extended. Then, this portion is formed in such a way that this portion of the pixel electrode 30 may cover the scanning line 23 provide d at the prestage. The "X" portion of the pixel electrode 30 is formed in such a manner that this X portion is not overlapped with either the thin-film transistor 26 or the signal line 24.

DETAILED STRUCTURE OF "X" PORTION

Next, the structure of the above-described "X" portion will be described more in detail with reference to FIG. 2.

That is, on the side of an active element substrate 39 in the first wide view angle liquid crystal display device, both the scanning line 23 and the common electrode line 31 are formed in a parallel manner on the transparent insulating substrate 21, on which a gate insulating film 36 such as a silicon oxide film is formed. Then, the "X" portion of the pixel electrode 30 made of the ITO film is formed on this gate insulating film 36 in such a manner that the pixel electrode 30 covers both the scanning line 23 and the common electrode line 31. Furthermore, a passivation film 33 made of, for example, a PSG (phosphosilicate glass) film and also a TFT-sided liquid crystal orientation layer 37 are stacked with covering the pixel electrode 30.

A major portion of such a region which is located opposite to the liquid crystal layer 34 via only the insulating films 36 and 33 formed on the scanning line 23 is covered by the pixel electrode 30 provided at a post stage. As a result, when a voltage is applied to the scanning line 23, an electric field produced from the scanning line 23 can be effectively shielded by the pixel electrode 30. On the side of a counter substrate 40 in this first wide view angle liquid crystal display device, a black matrix layer (will be referred to as a "BM layer" hereinafter) 27, a color layer 28, and a CF-sided liquid crystal orientation film 32 are stacked on a CF-sided transparent insulating substrate 22 in this order. The BM layer 27 is employed to shield unnecessary light. The color layer 28 is such a resin film containing three primary color (RGB) dye, or pigment.

THIN-FILM TRANSISTOR

Referring to FIG. 3, the thin-film transistor 26 and the peripheral portion thereof will be explained more in detail.

As shown in this drawing, both the gate electrode (scanning line) 23 and the common electrode line 31 are formed on the transparent insulating substrate 21 on the side of the TFT 26, on which the gate insulating film 36 is formed with covering these scanning line 23 and common electrode line. It should be noted that both the scanning line 23 and the common electrode line 31 are formed on the same layer as the gate electrode 23, namely the above-described TFT-sided transparent insulating substrate 21.

Also, an amorphous silicon layer 25 is formed on the gate insulating film 36 over the gate electrode 23, and this amorphous silicon layer 25 will constitute a channel of the above-explained thin-film transistor 26. Also, an $n^+$ type amorphous silicon layer 35 used to make an ohmic contact is formed at both edge portions of the amorphous silicon layer 25. Both a drain electrode 24 and a source electrode 30 are formed each of the separated $n^+$ type amorphous silicon layers 35. The drain electrode 24 and the source electrode 30 are electrically connected to the signal line 24 and the pixel electrode 30, respectively. Furthermore, the passivation film 33 is formed so as to cover these drain electrode 24, source electrode 30, signal line 24 and pixel electrode 30.

The wide view angle liquid crystal display device of this first embodiment is further arranged by a TFT-sided liquid crystal orientation film 37 formed on this passivation film 33.

In this embodiment, such an entire substrate arranged by the structural elements defined from the TFT-sided transparent insulating substrate 21 up to the TFT-sided liquid crystal orientation film 37 will now be defined as an "active element substrate" 39.

The wide view angle liquid crystal display device according to the first embodiment is additionally provided with a liquid crystal layer 34 by which liquid crystal molecules are sealed. This liquid crystal layer 34 is arranged in such a manner that while both the CF-sided liquid crystal orientation film 32 and the TFT-sided liquid crystal orientation film 37 are juxtaposed with respect to this liquid crystal layer 34, the liquid crystal layer 34 is sandwiched by the active element substrate 39 and the counter substrate 40.

It should also be understood that spacers and seales are actually required in this wide view angle liquid crystal display device in order to maintain the desirable thickness of the liquid crystal layer 34 and further in order not to leak the liquid crystal molecules outside this liquid crystal layer 34. However, since these structural elements have no direct relation to the present invention, these structural elements are not illustrated, but also not explained.

In accordance with the above-described wide view angle liquid crystal display device of the first embodiment of the present invention, in such a pixel into which when the scanning line 23 is selected by the scanning signal, the data signal supplied to the signal line 24 has been written, the voltage is applied between the pixel electrode 30 and the common electrode line 31. As a result, the electric field is produced which is directed along the substantially horizontal direction with respect to the surface of the substrate 39, so that the liquid crystal molecules are rotated within the plane located essentially horizontal to the surface of the substrate 39 so as to perform the LCD display.

At this case, as indicated in FIG. 2, the pixel electrode 30 is extended along the extension direction of the signal line 24, so that this extended pixel electrode 30 may cover the scanning line 23 provided at the prestage, which is located adjacent to the relevant scanning line 23. However, this pixel electrode 30 is formed not to be overlapped with the thin-film-transistor 26 and the signal line 24. In other words, this pixel electrode 30 may cover the major portion of the region located opposite only to the liquid crystal layer 34 via the insulating films 36 and 33 on the scanning line 23.

As a consequence, since the electric field produced from the scanning line 23 is shielded by the pixel electrode 30, even when the color filter is used in which the black matrix layer 27 is made of the electric conductor, the adverse influence given by the potential at the scanning line 23 with respect to the potential at the black matrix layer 27 can be greatly reduced. As a result, there is no risk that the electric field of the display pixel portion is disturbed.

As a consequence, this wide view angle liquid crystal display device according to the first embodiment can solve the above-explained problems of the conventional wide view angle liquid crystal display device, namely while the electric field produced between the black matrix layer 27 and the display portion can be largely suppressed, the display fluctuations can be reduced.

STRUCTURE OF SECOND WIDE VIEW ANGLE LCD

Next, a description will be made of a second embodiment according to the present invention.

Figure 4:
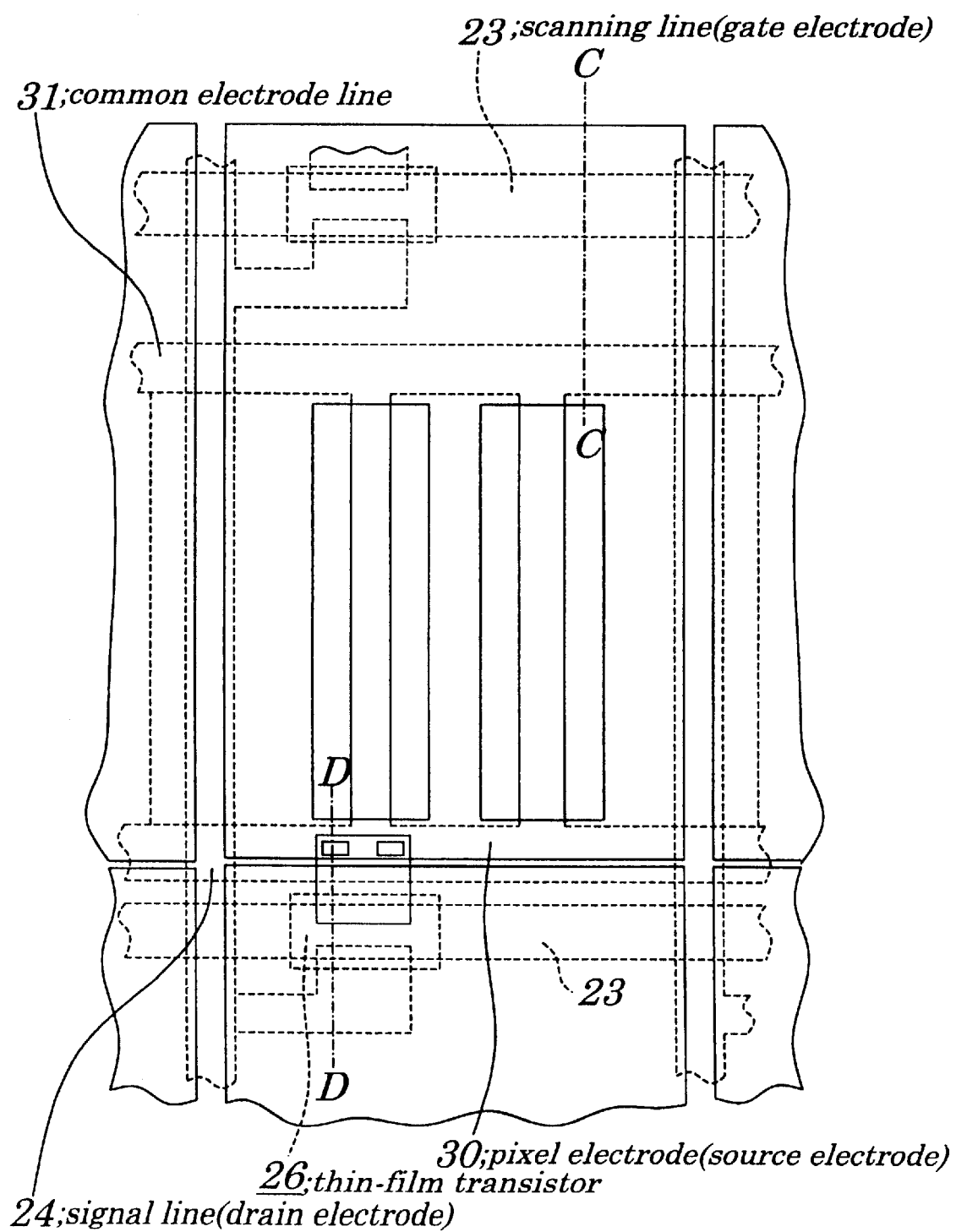
FIG. 4 is an upper view for schematically showing a structure of one pixel of a wide view angle liquid crystal display device according to a second embodiment of the present invention.
Figure 5:
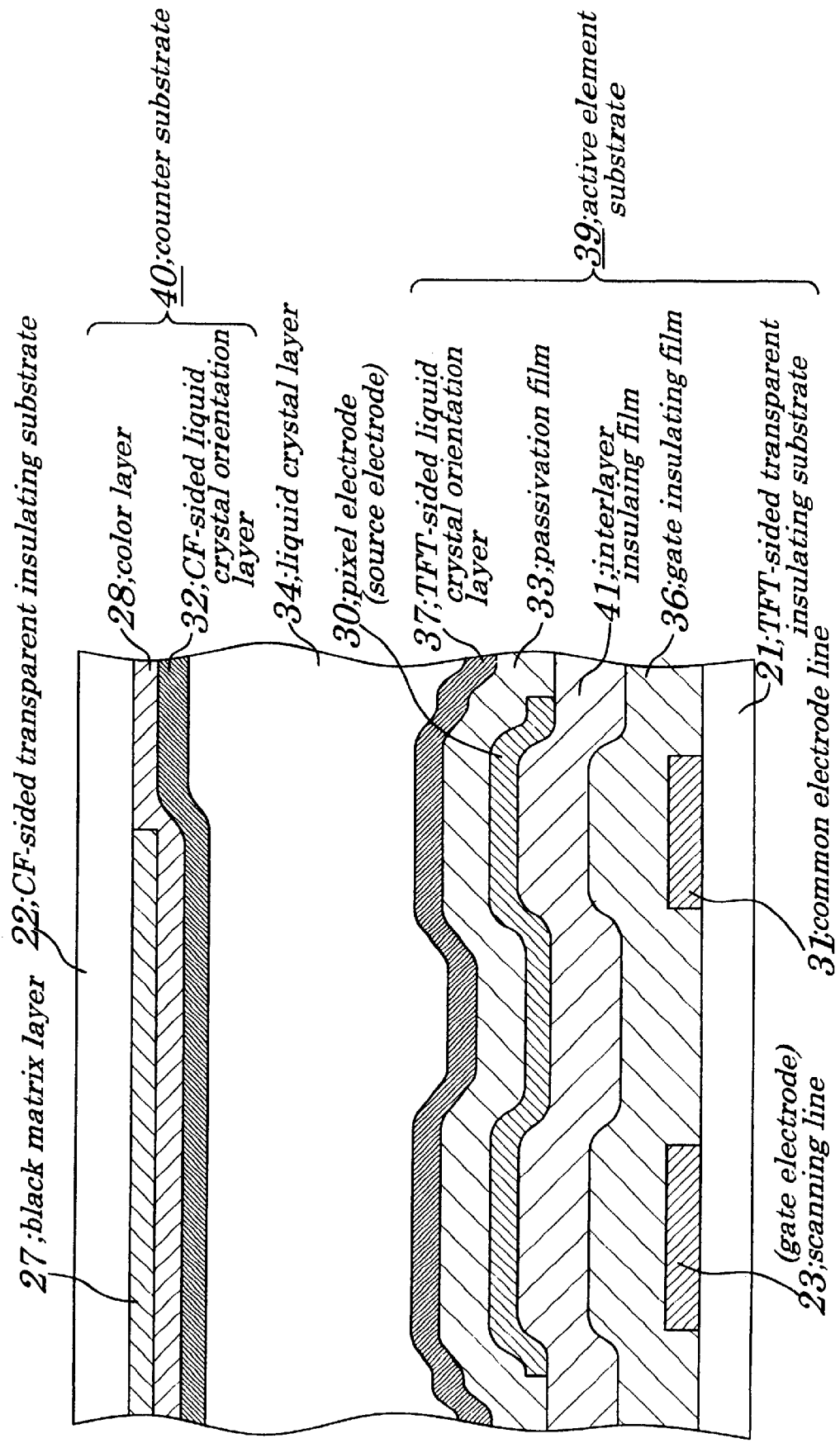
FIG. 5 is a sectional view for indicating the one pixel structure of the wide view angle liquid crystal display device, taken along a line C—C of FIG. 4.

FIG. 4 is a plan view for schematically showing a structure of one pixel of a wide view angle liquid crystal display (LCD) device according to a second embodiment of the present invention. FIG. 5 is a sectional view for indicating the wide view angle LCD device according to the second embodiment, taken along a line C—C of FIG. 4. Also, FIG. 6 is a sectional view for representing the wide view angle LCD device according to the second embodiment, taken along a line D—D of FIG. 4.

Also, the wide view angle liquid crystal display device according to this second embodiment is so arranged as to be driven by an LCD drive method similar to that of the first embodiment.

Figure 6:
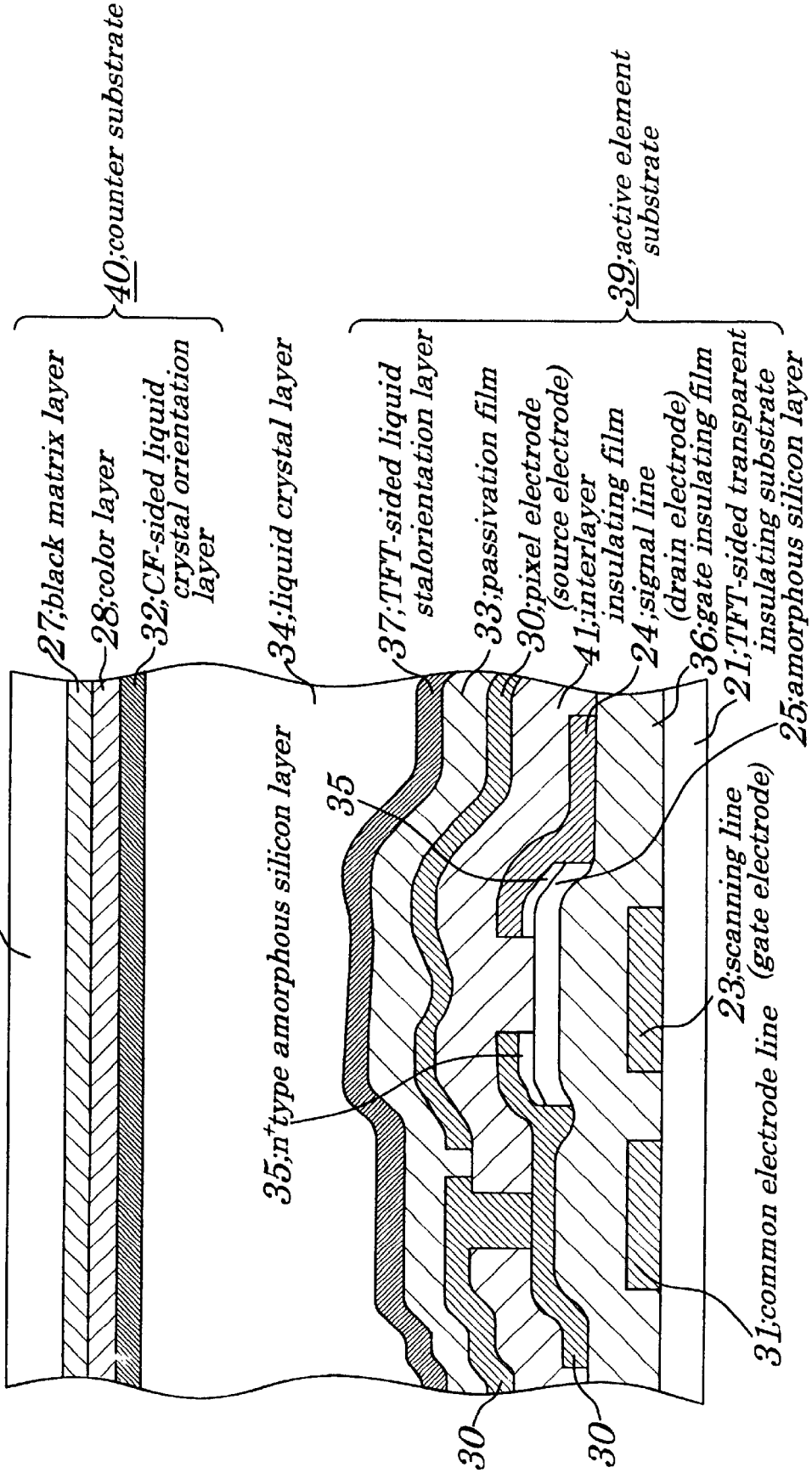
FIG. 6 is a sectional view for indicating the one pixel structure of the wide view angle liquid crystal display device, taken along a line D—D of FIG. 4.
Figure 7:
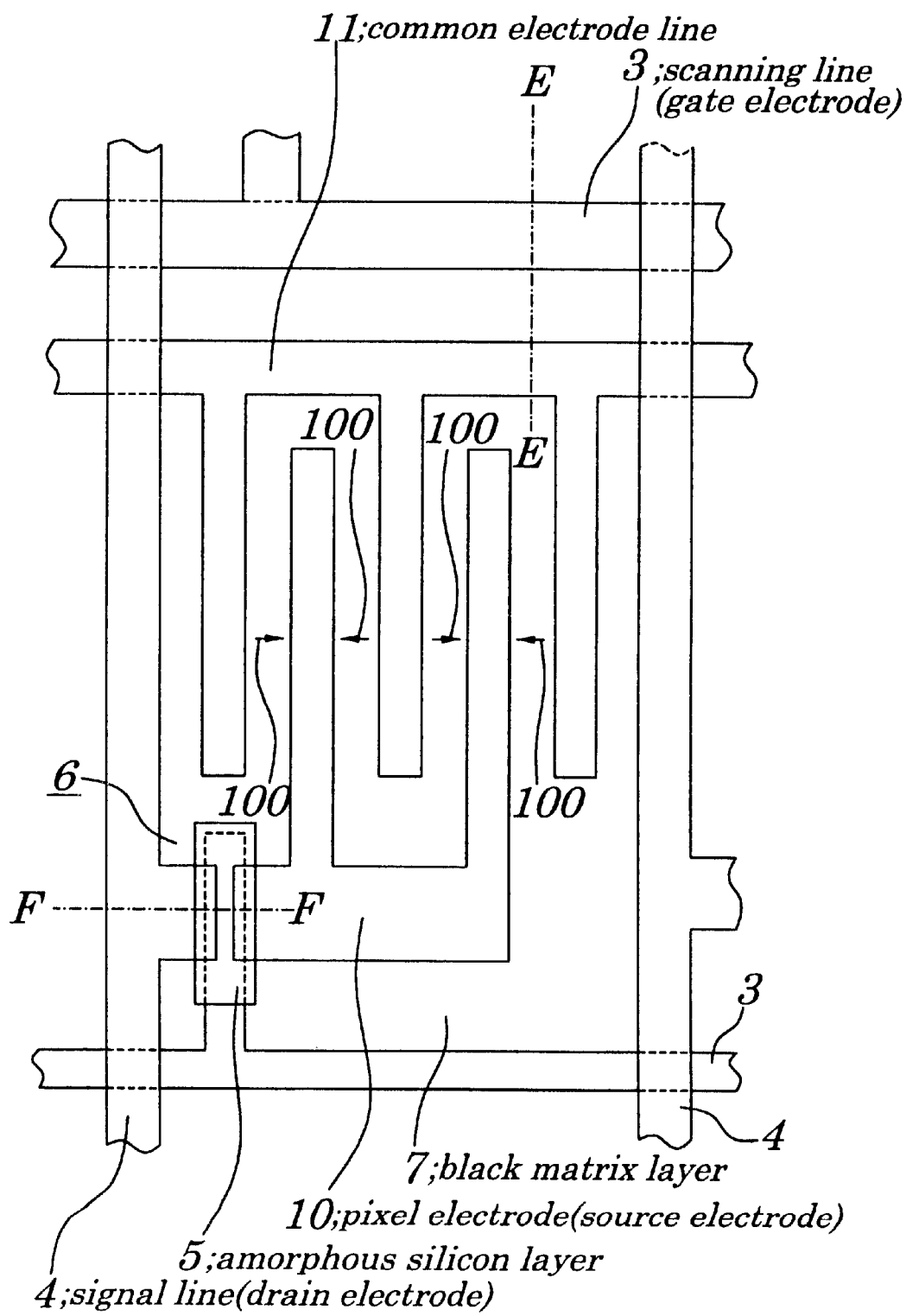
FIG. 7 is an upper view for schematically showing the structure of one pixel of the conventional wide view angle liquid crystal display device.
Figure 8:
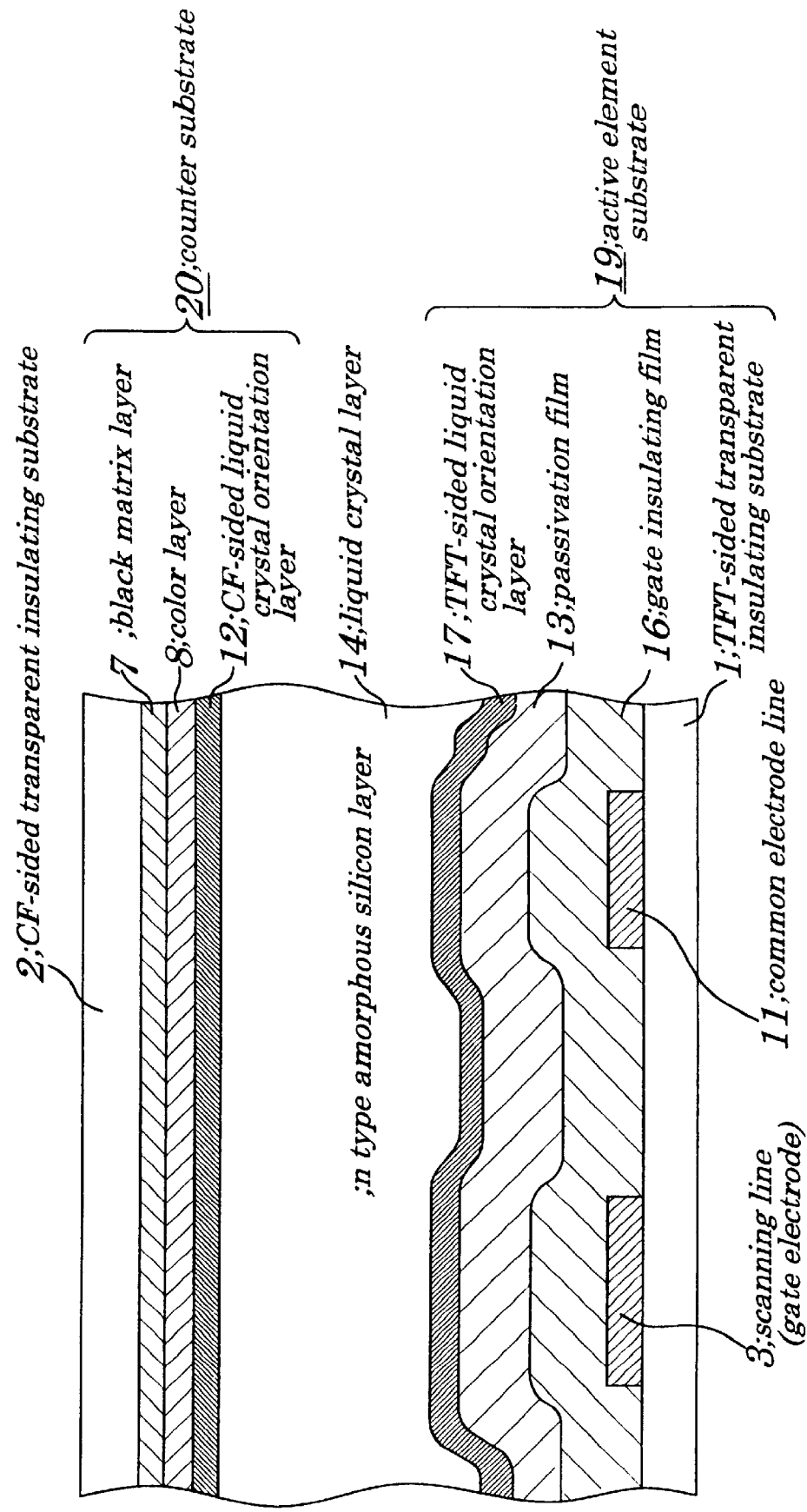
FIG. 8 is a sectional view for indicating the one pixel structure of the conventional wide view angle liquid crystal display device, taken along a line E—E of FIG. 7.
Figure 9:
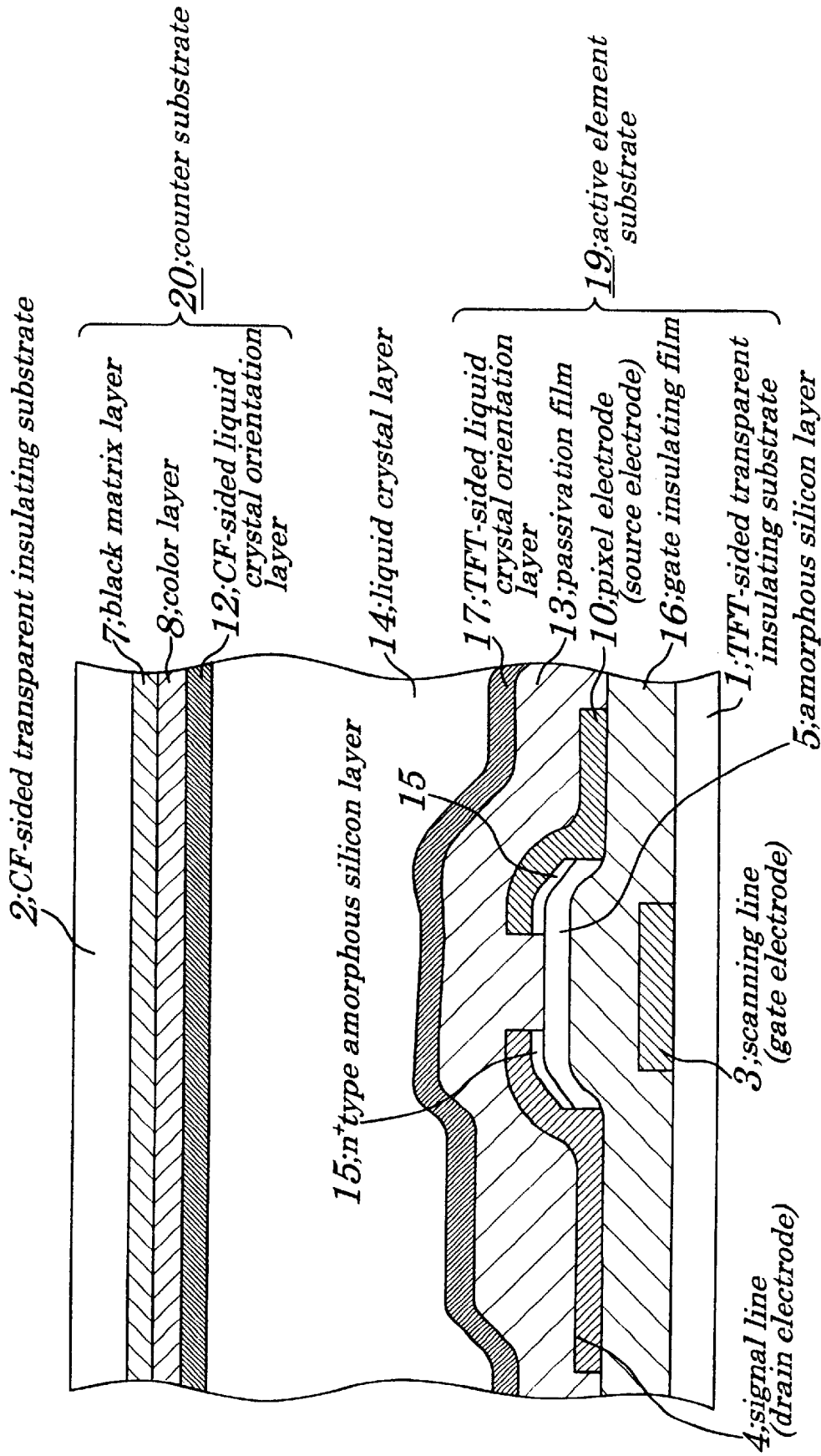
FIG. 9 is a sectional view for indicating the one pixel structure of the conventional wide view angle liquid crystal display device, taken along a line F—F of FIG. 7.

As represented in FIG. 4 to FIG. 6, the wide view angle liquid crystal device of the second embodiment owns a different structure from that of the first embodiment. That is, in addition to the layers shown in the LCD device (see FIG. 3) of the first embodiment, the pixel electrode 42 is extended up to the thin-film transistor 26 via an interlayer insulating film 41. Then, the pixel electrode 42 on the interlayer insulating film 41 is electrically connected via a contact formed in the interlayer insulating film 41 to the source electrode 30, so that the pixel electrode 42 is extended over the adjoining scanning line 23 (namely, at prestage) to cover the scanning line 43 provided at the prestage. Furthermore, since the layer where the pixel electrode 42 is formed is different from the layer where the thin-film transistor is formed, the pixel electrode 42 is also extended over the thin-film transistor 26. It should also be noted that the same reference numerals shown in FIG. 1 to FIG. 3 will be employed as those for indicating the same, or similar structural elements in FIG. 4 to FIG. 6.

As described above, this liquid crystal display device of the second embodiment is featured by that the pixel electrode 30 covers the scanning line 23 provided at the prestage with respect to the extension direction of the signal line 24, and each of the pixel electrodes 30 is not overlapped with the pixel electrodes 30 located adjacent to each other (see FIG. 4 to FIG. 6).

As a consequence, in accordance with the wide view angle liquid crystal display device of the second embodiment, as indicated in FIG. 5 and FIG. 6, the pixel electrode 30 covers the entire region which is located opposite to the liquid crystal layer 34 only via the insulating films 36, 41, 33 formed on the scanning line 23, as compared with the conventional wide view angle liquid crystal display device.

As a consequence, the electric field produced from the scanning line 23 is shielded, so that there is no adverse influence caused by the potential at the scanning line 23 with respect to the potential at the black matrix layer 27. In other words, in accordance with the second wide view angle liquid crystal device, there is no risk that the potential at the scanning line 23 is leaked to the liquid crystal layer 34. Therefore, the average potential at the black matrix layer 27 is made equal to the potential at the common electrode line 31, which can suppress the electric field produced between the black matrix layer 27 and the display portion in the conventional wide view angle liquid crystal device.

More specifically, the feature of the second embodiment is given as follows in comparison with that of the first embodiment. That is, since the interlayer insulating film 41 is sandwiched between the thin-film transistor 26 and the pixel electrode 30, these pixel electrode 30 and thin-film transistor 26 can be formed on the different interlayer insulating layers 41 and 36, respectively. As a result, the overall scanning line 23 containing the thin-film transistor 26 located in the display portion can be covered. Accordingly, there is no risk that the potential at the scanning line 23 is leaked to the liquid crystal layer 34, and also the average potential at the black matrix layer 27 is made equal to the potential at the common electrode line 31, so that this potential at the black matrix layer 27 does not disturb the electric field of the display portion.

As a consequence, since the electric field produced from the scanning line 23 is shielded by the pixel electrode 30, even when the color filter is used in which the black matrix layer 27 is made of the electric conductor, the adverse influence given by the potentional at the scanning line 23 with respect to the potential at the black matrix layer 27 can be greatly reduced. As a result, there is no risk that the electric field of the display pixel portion is disturbed.

As a consequence, this wide view angle liquid crystal display device according to the second embodiment can solve the above-explained problems of the conventional wide view angle liquid crystal display device, namely while the electric field produced between the black matrix layer 27 and the display portion can be largely suppressed, the display fluctuations can be reduced.

While the present invention has been described in detail with reference to the various preferred embodiments shown in the relevant drawings, more concrete structures of the wide view angle liquid crystal display device according to the present invention are not limited to these preferred embodiments. Therefore, design changes may be made without departing from the gist of the present invention.

For example, in the first embodiment, the pixel electrode has covered the major portion of the scanning line in the region other than the thin-film transistor forming region among the scanning lines present in the adjoining pixel portions, while the insulating layer is sandwiched between the scanning line and the pixel electrode. Alternatively, this pixel electrode may cover either a portion or all of this scanning line in the region other than the thin-film transistor forming region. Also, in the second embodiment, the pixel electrode has entirely covered all of the scanning lines in the thin-film transistor forming region belonging to the adjoining pixel portion, while the insulating layer is sandwiched between the scanning line and the pixel electrode. Alternatively, this pixel electrode may cover either a portion, or a major portion of the scanning line in this thin-film transistor forming region.

Furthermore, the black matrix layer may be made of a non-conductive material.

As previously described in detail, in accordance with the wide view angle liquid crystal display device, the pixel electrode is formed in such a manner that this pixel electrode is extended along the extension direction of the signal line to thereby cover the scanning line provided at the prestage. In other words, the major portion of the region which is located opposite to the liquid crystal layer only via the insulating film formed over the scanning line is covered by the pixel electrode.

As a consequence, since the electric field produced from the scanning line is shielded by the pixel electrode, even when the color filter is used in which the black matrix layer is made of the electric conductor, the adverse influence given to the potential at the scanning line with respect to the potential at the black matrix layer can be greatly reduced.

As a result, there is no risk that the electric field of the display pixel portion is disturbed.

As a result, the wide view angle liquid crystal display device according to this embodiment can solve the above-explained problems of the conventional wide view angle liquid crystal display device, namely while the electric field produced between the black matrix layer and the display portion can be largely suppressed, the display fluctuations can be reduced.

Therefore, in comparison with the conventional wide view angle liquid crystal display device, it is possible to provide such a wide view angle liquid crystal display device that the electric field of the display portion can be made stable.

It is thus apparent that the present invention is not limited to the above embodiments but may be changed and modified without departing from the scope and spirit of the invention.

Finally, the present application claims the priority of Japanese Patent Application No. Hei9-310340 filed Nov. 12, 1997, which is herein incorporated by reference.

What is claimed is:

1. A liquid crystal display device comprising:
   (A) a first substrate including a plurality of scanning lines and a plurality of signal lines arranged in a matrix form; a common signal line extended in parallel to one of said scanning lines and one of said signal lines, for applying a reference potential thereto; a pixel electrode; and a thin-film transistor having a source electrode connected to said pixel electrode, a drain electrode connected to said one of said signal lines, and a gate electrode connected to said one of said scanning lines, said thin-film transistor being formed in an intersection portion between said one of said scanning lines and said one of said signal lines;
   (B) a second substrate including a black matrix layer and positioned opposite to said first substrate thereby sandwiching a liquid crystal layer between said first substrate and said second substrate; and
   (C) an insulating layer sandwiched between said pixel electrode of the first substrate and said one of said scanning lines; wherein:
      while a voltage is applied between said common signal line and said pixel electrode to thereby produce an electric field, a direction of a molecular axis of liquid crystal molecules contained in said liquid crystal layer is rotated within a plane located parallel to said first substrate so as to performer a liquid crystal display; and further wherein
      said pixel electrode of said first substrate covers a total width of a portion of at least one of the scanning lines, and
      said pixel electrode of said first substrate further covers a second portion of said at least one of the scanning lines, said second portion being located within a thin-film transistor forming region, while sandwiching the insulating layer between said at least one of the scanning lines and said pixel electrode.

2. A liquid crystal display device according to claim 1 wherein:
   said black matrix layer is made of an electric conductive material.

3. A liquid crystal display device according to claim 1 wherein:
   a region surrounded by said scanning line and said signal line constitutes a single pixel portion; and
   a pixel electrode of said one pixel portion covers the scanning line belonging to another pixel portion adjacent to said one pixel portion.

4. A liquid crystal display device according to claim 1 wherein:
   said thin-film transistor includes:
   the gate electrode formed on a transparent insulating substrate;
   a gate insulating film for covering said gate electrode;
   a channel layer formed on said gate insulating film over said gate electrode;
   the gate electrode and the drain electrode, which are formed in both edge portions of said channel layer; and
   an insulating layer for covering said channel layer, said source electrode, and said drain electrode.

5. A liquid crystal display device according to claim 4 wherein:
   said scanning lines and said common signal line are formed on said transparent insulating substrate, whereas
   said pixel electrode and said signal lines are formed on said gate insulating film.

6. A liquid crystal display device according to claim 1 wherein:
   said insulating layer has an opening portion; and
   said pixel electrode is formed on said insulating layer, and is connected via said opening portion of the insulating layer to said source electrode of said thin-film transistor.

7. A liquid crystal display device comprising:
   (A) a first substrate including a plurality of scanning lines and a plurality of signal lines arranged in a matrix form; a common signal line extended in parallel to one of said scanning lines and one of said signal lines, for applying a reference potential thereto; a pixel electrode; and a thin-film transistor having a source electrode connected to said pixel electrode, a drain electrode connected to said one of said signal lines, and a gate electrode connected to said one of said scanning lines, said thin-film transistor being formed in an intersection portion between said one of said scanning lines and said one of said signal lines;
   (B) a second substrate including a black matrix layer and positioned opposite to said first substrate thereby sandwiching a liquid crystal layer between said first substrate and said second substrate; and
   (C) an insulating layer sandwiched between said pixel electrode of the first substrate and said one of said scanning lines; wherein:
      while a voltage is applied between said common signal line and said pixel electrode to thereby produce an electric field, a direction of a molecular axis of liquid crystal molecules contained in said liquid crystal layer is rotated within a plane located parallel to said first substrate so as to perform a liquid crystal display; and further wherein:
      said pixel electrode of said first substrate covers a total width of a portion of at least one of the scanning lines, said portion being located in a region other than a thin-film transistor forming region, and said pixel electrode of said first substrate further covers at least a second portion of said at least one of the scanning lines, said second portion being located within said thin-film transistor forming region, while sandwiching the insulating layer between said at least one of the scanning lines and said pixel electrode.

8. A liquid crystal display device according to claim 7 wherein:

said black matrix layer is made of an electric conductive material.

9. A liquid crystal display device according to claim 7 wherein:

a region surrounded by said scanning line and said signal line constitutes a single pixel portion; and a pixel electrode of said one pixel portion covers the scanning line belonging to another pixel portion adjacent to said one pixel portion.

10. A liquid crystal display device according to claim 7 wherein:

said thin-film transistor includes:

the gate electrode formed on a transparent insulating substrate;

a gate insulating film for covering said gate electrode;

a channel layer formed on said gate insulating film over said gate electrode;

the gate electrode and the drain electrode, which are formed in both edge portions of said channel layer; and an insulating layer for covering said channel layer, said source electrode, and said drain electrode.

11. A liquid crystal display device according to claim 10 wherein:

said scanning lines and said common signal line are formed on said transparent insulating substrate, whereas said pixel electrode and said signal lines are formed on said gate insulating film.

12. A liquid crystal display device according to claim 7 wherein:

said insulating layer has an opening portion; and said pixel electrode is formed on said insulating layer, and is connected via said opening portion of the insulating layer to said source electrode of said thin-film transistor.

13. A liquid crystal display device comprising:

(A) a first substrate including a plurality of scanning lines and a plurality of signal lines arranged in a matrix form; a common signal line extended in parallel to one of said scanning lines and one of said signal lines, for applying a reference potential thereto; a pixel electrode; and a thin-film transistor having a source electrode connected to said pixel electrode, a drain electrode connected to said one of said signal lines, and a gate electrode connected to said one of said scanning lines, said thin-film transistor being formed in an intersection portion between said one of said scanning lines and said one of said signal lines;

(B) a second substrate including a black matrix layer and positioned opposite to said first substrate thereby sandwiching a liquid crystal layer between said first substrate and said second substrate; and (C) an insulating layer sandwiched between said pixel electrode of the first substrate and said one of said scanning lines; wherein:

while a voltage is applied between said common signal line and said pixel electrode to thereby produce an electric field, a direction of a molecular axis of liquid crystal molecules contained in said liquid crystal layer is rotated within a plane located parallel to said first substrate so as to perform a liquid crystal display; and further wherein said pixel electrode of said first substrate covers a total width of a portion, of at least one of the scanning lines, located in a region disposed between adjacent two of said signal lines, and said portion covered by said pixel electrode of said first substrate includes a second portion of said at least one of the scanning lines, said second portion being located within a thin-film transistor forming region, said pixel electrode sandwiching the insulating layer between said at least one of the scanning lines and said pixel electrode.

14. A liquid crystal display device according to claim 13 wherein:

said black matrix layer is made of an electric conductive material.

15. A liquid crystal display device according to claim 13 wherein:

a region surrounded by said scanning line and said signal line constitutes a single pixel portion; and a pixel electrode of said one pixel portion covers the scanning line belonging to another pixel portion adjacent to said one pixel portion.

16. A liquid crystal display device according to claim 13 wherein:

said thin-film transistor includes:

the gate electrode formed on a transparent insulating substrate;

a gate insulating film for covering said gate electrode;

a channel layer formed on said gate insulating film over said gate electrode;

the gate electrode and the drain electrode, which are formed in both edge portions of said channel layer; and an insulating layer for covering said channel layer, said source electrode, and said drain electrode.

17. A liquid crystal display device according to claim 16 wherein:

said scanning lines and said common signal line are formed on said transparent insulating substrate, whereas said pixel electrode and said signal lines are formed on said gate insulating film.

18. A liquid crystal display device according to claim 13 wherein:

said insulating layer has an opening portion; and said pixel electrode is formed on said insulating layer, and is connected via said opening portion of the insulating layer to said source electrode of said thin-film transistor.

19. A liquid crystal display device comprising:

(A) a first substrate including a plurality of scanning lines and a plurality of signal lines arranged in a matrix form; a common signal line extended in parallel to one of said scanning lines and one of said signal lines, for applying a reference potential thereto; a pixel electrode; and a thin-film transistor having a source electrode connected to said pixel electrode, a drain electrode connected to said one of said signal lines, and a gate electrode connected to said one of said scanning lines, said thin-film transistor being formed in an intersection portion between said one of said scanning lines and said one of said signal lines;

(B) a second substrate including a black matrix layer and positioned opposite to said first substrate thereby sandwiching a liquid crystal layer between said first substrate and said second substrate; and (C) an insulating layer sandwiched between said pixel electrode of the first substrate and said one of said scanning lines; wherein:

while a voltage is applied between said common signal line and said pixel electrode to thereby produce an electric field, a direction of a molecular axis of liquid crystal molecules contained in said liquid crystal layer is rotated within a plane located parallel to said first substrate so as to perform a liquid crystal display; and further wherein:

said pixel electrode comprises:

a plurality of drawing electrodes extended respectively in parallel to one of said signal lines;

a first connecting portion for connecting one ends of said drawing electrodes to each other, respectively; and a second connecting portion for connecting other ends of said drawing electrode to each other, respectively;

wherein said first connecting portion extends opposite to said second connecting portion and covers a total width of a portion of at least one of said scanning lines.

\* \* \* \* \*